United States Patent [19]

Miyake

[11] Patent Number: 4,962,971
[45] Date of Patent: Oct. 16, 1990

[54] ANTI-SKID CONTROL SYSTEM FOR MOTOR VEHICLES

[75] Inventor: Katsuya Miyake, Ageo, Japan

[73] Assignee: Akebono Brake Industry Co., Ltd., Tokyo, Japan

[21] Appl. No.: 273,219

[22] Filed: Nov. 18, 1988

[30] Foreign Application Priority Data

Nov. 19, 1987 [JP] Japan .................... 62-290675

[51] Int. Cl.$^5$ .................... B60T 8/26; B60T 8/02
[52] U.S. Cl. .................... 303/100; 303/9.62; 303/119
[58] Field of Search .......... 303/100, 111, 113, 115, 303/119, 9.62, 9.63, 104

[56] References Cited

U.S. PATENT DOCUMENTS

| | | | |
|---|---|---|---|
| 4,418,966 | 12/1983 | Hattwig | 303/119 X |
| 4,657,313 | 4/1987 | Fennel et al. | 303/100 |
| 4,815,793 | 3/1989 | Reinartz et al. | 303/119 |

FOREIGN PATENT DOCUMENTS

| | | | |
|---|---|---|---|
| 0166700 | 1/1986 | European Pat. Off. | 303/100 |
| 0034274 | 2/1980 | Japan | 303/100 |
| 2091829 | 8/1982 | United Kingdom | 303/9.62 |
| 2156461 | 10/1985 | United Kingdom | 303/119 |

*Primary Examiner*—Matthew C. Graham

[57] ABSTRACT

In an anti-skid control system for a motor vehicle equipped with an X-type two-channel anti-skid control brake apparatus, there are provided a valve which is located in a piping connecting a modulator for increasing and reducing the brake fluid pressure in a respective one of the two channels and arranged to be closed when rear wheel tends to be locked earlier than the front wheel; and a check valve which is disposed in parallel relationship to the first-mentioned valve and arranged to only permit the brake pressure fluid to flow from the rear wheel cylinder to the modulator in the respective one of the two channels.

1 Claim, 4 Drawing Sheets

ANTI-SKID CONTROL SYSTEM FOR MOTOR VEHICLES

BACKGROUND OF THE INVENTION

1. Field of the Invention:

This invention relates to an anti-skid control system for a motor vehicle which is equipped with a X-type two-channel brake apparatus wherein one of the two channels includes brake apparatus associated with the front righthand and rear lefthand wheels which are disposed in diagonal relationship with each other, and the other channel includes brake apparatus associated with the front lefthand and rear righthand wheels which are disposed in diagonal relationship with each other.

2. Description of the Prior Art:

Generally, with an anti-skid control system for motor vehicles, anti-skid control is effected by means of microcomputers such that hold valves and decay valves comprising electromagnetic valves are opened and closed on the basis of electrical signals representing wheels speeds sensed by wheel speed sensors, thereby increasing, holding or reducing the brake pressure, for the purpose of securing improved steering performance and running stability of the motor vehicle, while at the same time shortening the braking distance, as disclosed in U.S. Pat. No. 4,752,104 and in FIG. 1 of the accompanying drawings of this application.

In the case where such an anti-skid control system is applied to a motor vehicle equipped with X-type two-channel brake apparatus which is arranged such that the front righthand and rear lefthand wheels are braked through a first common brake fluid pressure piping channel while the front lefthand and rear righthand wheels are braked through a second common brake fluid pressure piping channel, the lower one of the velocities of the two wheels associated with respective one of the two hydraulic pressure piping channels is selected (referred to as "select low" hereinafter) and used as channel speed which represents the speeds of the wheels associated with the respective channel, and anti-skid control such as mentioned above is effected on the basis of such channel speeds (referred to as "two-channel control" hereinafter).

With a front wheel drive type motor vehicle including a conventional cross piping type (X-type) two-channel brake system, due to the fact that the weight proportion of the front wheels is higher than that of the rear wheels, a great braking force is produced when the front wheel speed is selected as the channel speed for each cycle of anti-skid control such as mentioned above so that the braking distance can be reduced, whereas when the rear wheel speed is selected as the channel speed, only a small braking force is generated so that the braking distance tends to be increased.

Especially, for a road surface which represents different friction coefficients ($\mu$) between the lefthand and righthand side portions thereof (referred to as "split $\mu$ road surface" hereinafter), if control is effected by always using, as the channel speed, the lower one of the speeds of one of the front wheels and the rear wheel which is disposed in diagonal relationship therewith as is the case with the prior art (referred to as "diagonal select low" hereinafter), then the front wheel running on the higher $\mu$ road surface is controlled with a hydraulic pressure rate corresponding to the wheel speed of the rear wheel running on the lower $\mu$ road surface so that the braking force applied to the front wheel turns out to be short and as a result the braking distance tends to be increased. On the other hand, two-channel control of the type that the higher one of the rear lefthand and righthand wheel speeds and the lower one of the respective front wheel speeds are always selected as the channel speeds, is disadvantageous in that the rear wheel running on the lower $\mu$ portion of the road surface is liable to be locked.

SUMMARY OF THE INVENTION

Accordingly, it is a primary object of the present invention to provide a novel and improved anti-skid control system for a motor vehicle and which is so designed as to be able to most effectively solve such problems that the braking distance tends to be increased when the rear wheel or wheels are to be locked earlier than the front wheel or wheels; and that when the motor vehicle is running on split-$\mu$ road surface, the braking distance tends to be increased and/or the rear wheel on the low-$\mu$ road surface tends to be locked.

Briefly stated, according to the present invention, an X-type two-channel anti-skid control brake apparatus is provided with a valve which is located in a piping connecting a modulator for increasing and reducing the brake fluid pressure in a respective one of the two channels and arranged to be closed when rear wheel tends to be locked earlier than the front wheel; and a check valve which is disposed in parallel relationship to the first-mentioned valve and arranged to only permit the brake pressure fluid to flow from the rear wheel cylinder to the modulator.

As mentioned above, according to the present invention, a valve arranged to be closed when the rear wheel tends to be locked earlier than the front wheel, is provided in a piping through which a rear wheel cylinder is connected to a modulator; thus, when there is a tendency that the rear wheel is to be locked earlier, the brake pressure being applied thereto at that time is held, and anti-skid control is effected only with respect to the front wheel on the basis of the front wheel speed so that the braking force being imparted to the front wheel can sufficiently work while the braking force being applied to the rear wheel is maintained.

As will be appreciated, even for a split-$\mu$ road surface, according to the present invention, (1) with "diagonal select low" control, a sufficient braking force can be imparted to the front wheel running on the high-$\mu$ road surface while the braking force being applied to the rear wheel running on the low-$\mu$ road surface, thereby making it possible to remarkably shorten the braking distance; and (2) with control wherein the higher one of the rear wheel speeds and the lower one of the front wheel speeds are used as the channel speeds, when there occurs a tendency that that one of the rear lefthand and righthand wheels which is running on the low-$\mu$ road surface with a lower rotational speed, is to be locked earlier, the above-mentioned valve is closed, and from that point of time onward, the brake fluid pressure imparted to that rear wheel is held so that no further buildup of the brake fluid pressure is produced, thereby making it possible to prevent the rear wheel running on the low-$\mu$ road surface from being locked.

Furthermore, according to the present invention, a check valve which only permits brake hydraulic fluid flow from the rear wheel cylinder toward the modulator, is provided in parallel relationship with the first-mentioned valve which is arranged to be closed when the rear wheel tends to be locked earlier, as described above; thus, after the first-mentioned valve is closed, and when the motor vehicle runs on a low-μ road surface so that the brake fluid pressure being applied to the front wheel is reduced and becomes lower than the brake fluid pressure being imparted to the front wheel, the brake hydraulic fluid is permitted to flow from the rear wheel cylinder to the modulator so that the brake fluid pressure being applied to the rear wheel is also reduced to substantially the same extent as that being imparted to the front wheel, thereby making it possible to more positively prevent the rear wheel from being locked.

Other objects, features and advantages of the present invention will become apparent from the ensuing description taken in conjunction with the accompanying drawings.

DESCRIPTION OF THE PREFERRED EMBODIMENTS

Figure 1:
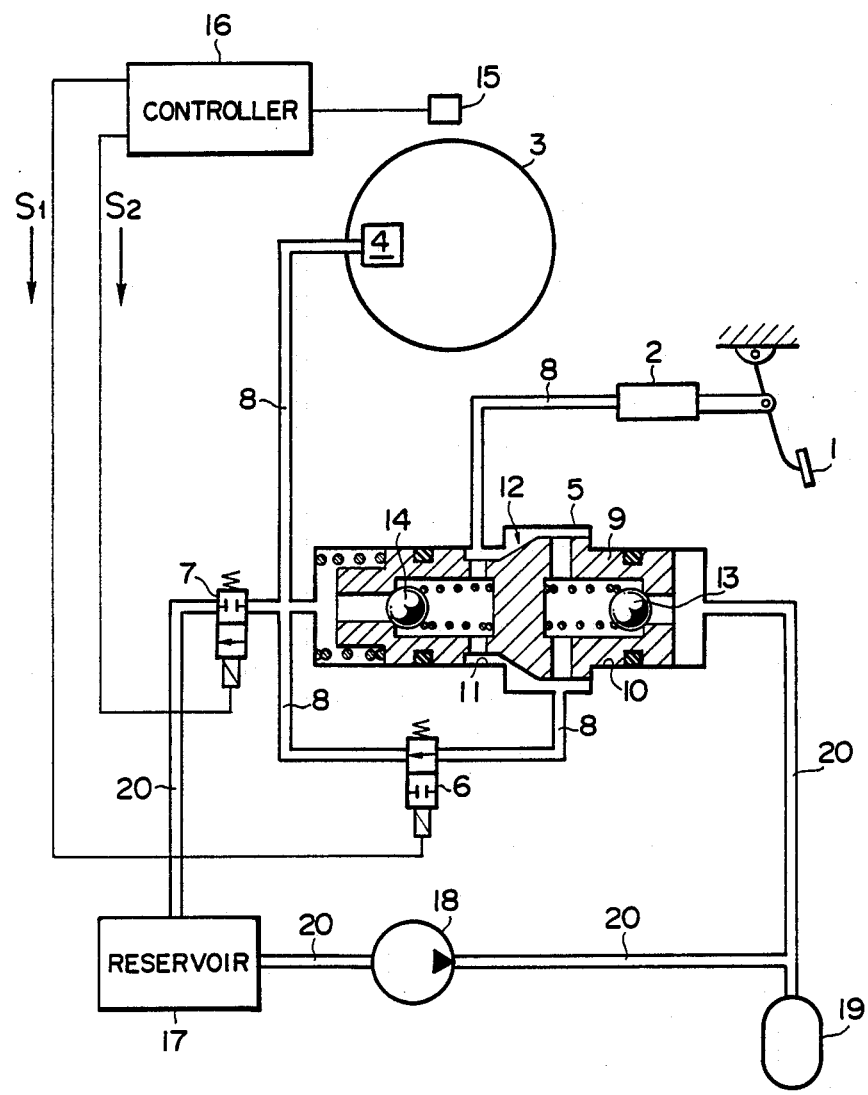
FIG. 1 is a view illustrating an example of anti-skid control brake apparatus to which the present invention is applicable.

Referring first to FIG. 1, there is illustrated an example of the arrangement of anti-skid control system to which the present invention is applicable. The illustrated arrangement, which is a simplified form of the arrangement disclosed in U.S. Pat. No. 4,572,104, includes a brake pedal 1, master cylinder 2, wheel 3, wheel cylinder 4 for wheel brake apparatus, gate valve 5, brake pressure increasing and holding electromagnetic valve means 6 (referred to as build valve hereinafter), brake pressure reducing electromagnetic valve means 7 (referred to as decay valve hereinafter), and brake fluid pressure transmitting main passage 8 extending from the master cylinder 2 to the wheel cylinder 4 via the gate valve 5 and build valve 6.

The gate valve 5 includes cylinders 10 and 11 containing differential pressure-responsive piston 5 and is arranged such that a valve portion 12 is closed in response to the piston 9 being displaced to the left as viewed in the drawing, due to a differential pressure. Upon closure of the valve portion 12, the master cylinder and wheel cylinder are isolated from each other in terms of pressure. Indicated at 13 and 14 are a check valve and relief valve respectively.

A wheel velocity detector or speed sensor indicated at 15 is provided in association with the wheel 3 and arranged to provide detected information to a control circuit 16 which typically comprises a microcomputer. The control circuit 16 is equipped with such functions as shown in the block diagram of FIG. 3 and arranged to provide a brake fluid pressure increasing/holding signal S1 or brake pressure reducing signal S2 in response to the information detected by the speed sensor 15.

The build valve 6, which is normally open, is closed in response to the brake fluid pressure holding signal S1 derived from the control circuit 16, and thereupon the brake fluid pressure transmitting main passage 8 is interrupted so that a brake fluid pressure holding condition is established. The decay valve 7, which is normally closed, is opened in response to the brake fluid pressure reducing signal S2 derived from the control circuit 16, and thereupon pressure fluid in the wheel cylinder 4 is pumped into an accumalotor 19 by means of a pump 18 through a reservoir 17 and the thus pumped pressure fluid is returned between the gate valve 5 and the build valve 6 through a by-pass passage 20.

Although in the foregoing discussion, only the system associated with one wheel has been described just for the sake of convenience, a similar system is also provided in association with each of the other wheels, and such systems are associated with each other in such a unique manner as mentioned hereinafter according to the present invention.

Figure 2:
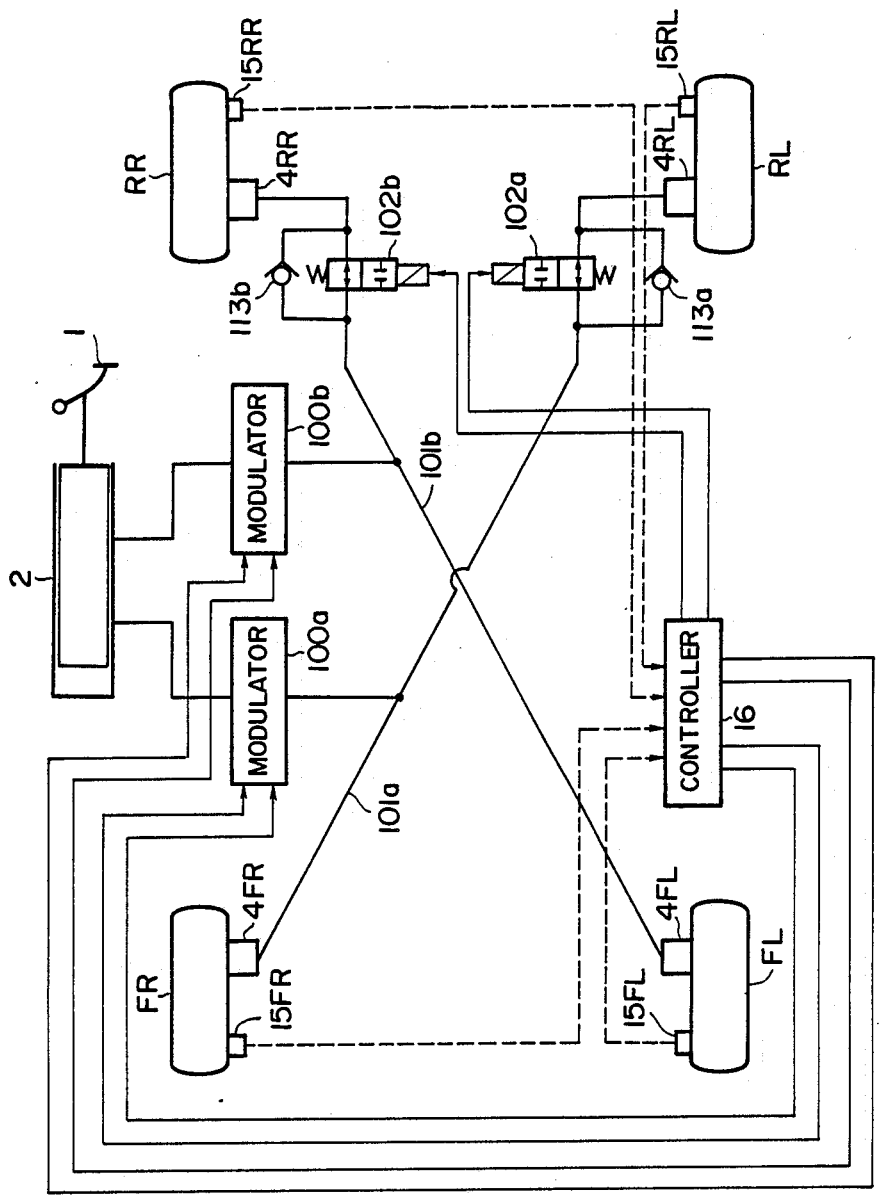
FIG. 2 is a view illustrating the piping arrangement of the anti-skid control system according to an embodiment of the present invention.
Figure 3:
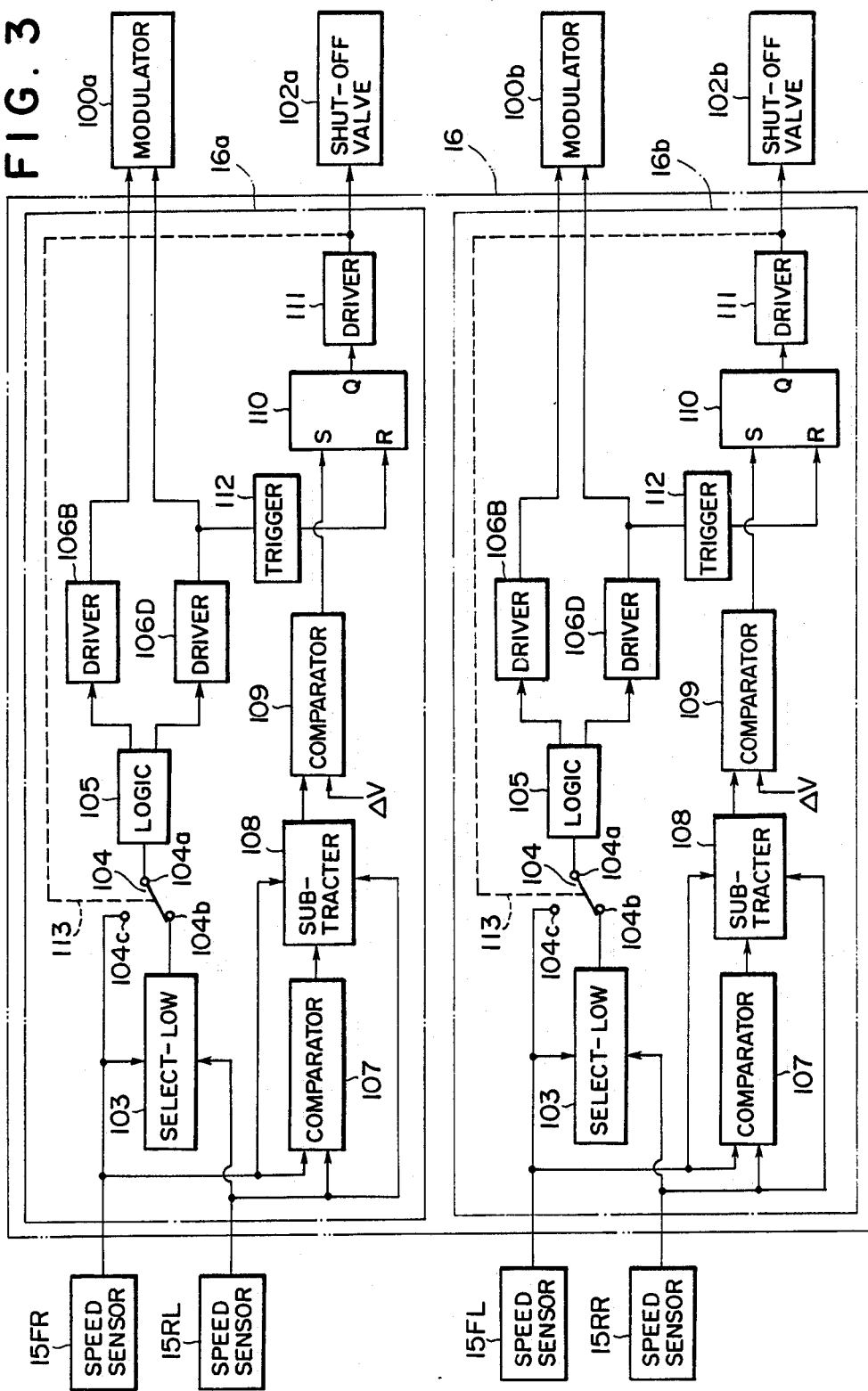
FIG. 3 is a block diagram showing an example of control circuit arrangement incorporated in the anti-skid control apparatus of FIG. 1.

FIG. 2 is a view useful for explaining the piping arrangement of the brake apparatus embodying the present invention, and FIG. 3 is a block diagram showing an example of the arrangement of the control circuit 16 incorporated in the system embodying the present invention. In FIGS. 2 and 3, parts corresponding to FIG. 1 are indicated by like reference numerals, and in these figures, FR indicates the front righthand wheel, FL the front lefthand wheel, RR the rear righthand wheel, and RL the rear lefthand wheel, these letters, when used as suffixes, indicating parts associated with the respective wheels The arrangement illustrated in FIG. 2 includes speed sensors 15FR, 15FL, 15RR and 15RL, and modulators 100a and 100b each including a gate valve, build valve, decay valves and so forth which were described above in connection with FIG. 1. The modulator 100a is coupled to wheel cylinders 4FR and 4RL for the front righthand wheel FR and rear lefthand wheel RL through a pressure fluid piping 101a , and the other modulator 100b is connected to wheel cylinders 4FL and 4RR for the front lefthand wheel FL and rear righthand wheel RR through another pressure fluid piping 101b. As will be appreciated from this, the brake apparatus shown in FIG. 2 is constructed in the form of X-type piping arrangement. According to this embodiment of the invention, solenoid valves 102a and 102b are provided in communication with the pressure fluid pipings 101a and 101b between the modulator 100a and the wheel cylinder 4RL and between the modulator 100b and the wheel cylinder 4RR; and check valves 113a and 113b are provided in parallel with the solenoid valves 102a and 102b respectively. The check valves 113a and 113b are arranged to permit of only brake pressure fluid flow directed from the the rear wheel cylinders 4RL and 4RR to the modulators 100a and 100b, respectively. The solenoid valves 102a and 102b are arranged to be operated in response to a signal derived from the control circuit 16, and this will be described in detail with reference to FIG. 3.

As shown in FIG. 3, the control circuit 16 may comprise a first control circuit section 16a provided for the channel associated with the front righthand and rear lefthand wheels, and a second control circuit section 16b provided for the channel associated with the front lefthand and rear righthand wheels. These two control circuit sections may be constructed in the same configuration, and therefore description will be made of the control circuit section 16a for the sake of convenience. In FIG. 3, parts corresponding to FIG. 1 are indicated by like reference numerals, and parts corresponding to FIG. 2 are also indicated by like reference numerals.

Herein, a circuit for selecting the lower one of two wheel speeds is referred to as "select-low circuit". In the control circuit section 16a, a select-low circuit 103 is provided which has a pair of input terminals connected to the front righthand wheel speed sensor 15FR and rear lefthand wheel speed sensor 15RL through wheel speed computing circuits (not shown). The select-low circuit 103 also has its output terminal connected to a logic circuit 105 through a change-over switch 104. The logic circuit 105 has its output terminal connected to a build valve driver circuit 106B and decay valve driver circuit 106D. The change-over switch 104 comprises a movable contact 104a, and two fixed contacts 104b and 104c. The output terminal of the select-low circuit 103 is connected to the fixed contact 104b, and the speed sensor 15FR is coupled to the other fixed contact 104c through the wheel speed computing circuit (not shown). The movable contact 104a is normally disposed in engagement with the fixed contact 104b.

A comparator 107 is provided, and the speed sensors 15FR and 15RL are connected to a pair of input terminals of the comparator 107 through the aforementioned wheel speed computing circuits (not shown) respectively. The speed sensors 15FR and 15RL are also coupled to a subtracter 108 which is connected to the output of the comparator 107. The output of the subtracter 108 is connected to one input terminal of a second comparator 109, and a signal $\Delta V$ representing a certain speed difference is passed to another input terminal of the comparator 109. The output of the comparator 109 is connected to a set terminal S of a flip-flop circuit 110 which has its output terminal coupled to a driver circuit 111 for the aforementioned solenoid valve 102a. Connected to reset terminal R of the flip-flop circuit 110 is a off-trigger generator 112 which is adapted to be operated by the output of the decay valve driver circuit 106D.

Although the foregoing explanation was directed to the control circuit section 16a for the channel associated with the front righthand and rear lefthand wheels, it equally applies to the control circuit section 16b for the channel associated with the front lefthand and rear righthand wheels as well since the latter is construction in the same configuration as the control circuit section 16a, and this is also true of the operation which will be described below.

Figure 4:
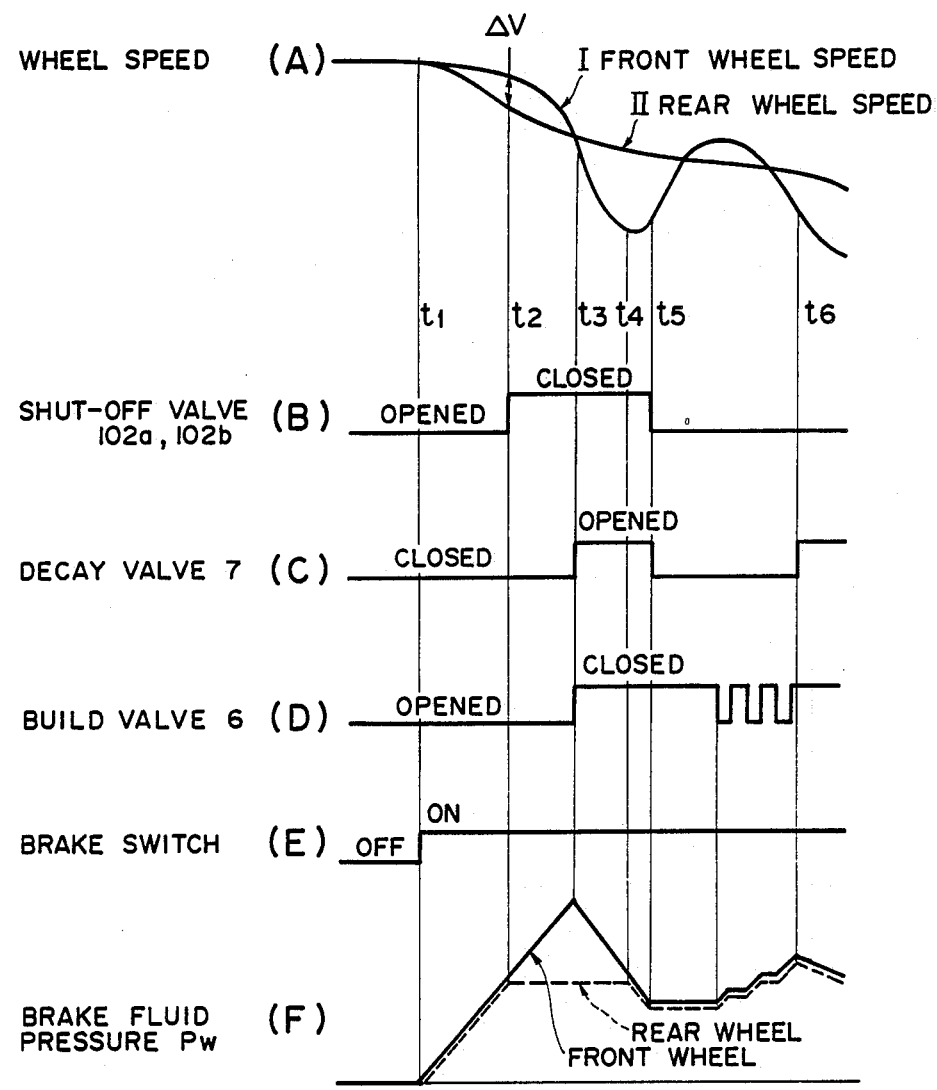
FIG. 4 is a view useful for explaining the operation of the anti-skid control system of FIG. 1.

Let it now be assumed that a brake switch (not shown) is turned on at time t1 as shown in FIG. 4(E) by depressing a brake pedal 1 and thus that the front wheel and rear wheel speeds are decreased as shown by curves I and II in FIG. 4(A) respectively. Signals representing wheel speeds detected by the speed sensors 15FR and 15RL are compared with each other in the comparator 107, subsequently the signal representing the rear wheel speed is subtracted from the signal representing the front wheel speed in the subtracter 108; the output of the subtracter 108, i.e., the difference S between the two signals is compared in the comparator 109 with the aforementioned signal $\Delta V$. Assuming that the difference S exceeds $\Delta V$ at time t2, an output signal is derived from the comparator 109 and passed to the set terminal S of the flip-flop circuit 110, as a result of which an output signal is obtained at the output terminal Q of the flip-flop circuit 110 and passed to the driver circuit 111; thus, as shown in FIG. 4(B), the solenoid valve 102a is closed at the time t2 so that the brake fluid pressure being applied to the rear wheel is held. At the same time, the change-over switch 104 is operated by the output of the driver circuit 111 so that the movable contact 104a is brought into engagement with the fixed contact 104c, so that anti-skid control is effected on the basis of the front wheel speed with respect to the front wheel alone. Such anti-skid control operation is shown, by way of example, at (C) and (D) in FIG. 4. FIG. 4(C) shows the manner in which the decay valve 7 in the modulator 100a is opened and closed, and FIG. 4(D) shows the manner in which the build valve 6 in the modulator 100a is opened and closed.

As shown in FIG. 4, the solenoid valve 102a is closed at the time t2 when the rear wheel speed shown by the curve II in FIG. 4 becomes lower by $\Delta V$ than the front wheel speed shown by the curve I in FIG. 4, and as long as the solenoid valve 102b is closed, the brake fluid pressure for the rear wheel is cut off from reservoir 19 and held. In this way, such anti-skid control as shown at (C) and (D) in FIG. 4 is effected on the basis of the front wheel speed with respect to the front wheel alone. More specifically, at time t3 when a predetermined deceleration of the front wheel occurs, the build valve 6 is closed as shown at (D) in FIG. 4, and the decay valve 7 is opened so that reduction of the brake fluid pressure is started. At time t5 when the front wheel speed is higher that a low peak which occurs at time t4 by a predetermined percentage (say 15 %) of the difference between the front wheel speed at the time t3 and the low peak of the front wheel speed at the time t4, the decay valve 7 is closed. In response thereto, the off-trigger generator 112 provides an output signal which in turn is passed to the reset terminal R of the flip-flop circuit 110, and thereupon the flip-flop circuit 110 provides at the output terminal Q a signal which in turn is passed to the solenoid valve driver circuit 111, thus resulting in the solenoid valve being opened. From time when a high peak of the front wheel speed is reached, the build valve 6 is opened and closed mincingly, or with short intervals, as shown at (D) in FIG. 4, as a result of which the brake fluid pressure Pw is made to build up gradually, and at time t6, reduction of the brake fluid pressure is started again.

FIG. 4(F) illustrates the manner in which the brake fluid pressure Pw is controlled through the various operations mentioned above in connection with FIGS. 4(B) to (E), wherein the solid lines indicate how the brake fluid pressure with respect to the front wheel is controlled, and the broken lines show how the brake fluid pressure with respect to the rear wheel is controlled.

Let it be assumed that the solenoid valve 102a is closed at the time t2 so that the the brake fluid pressure Pw for the rear wheel is held; in such a state, the motor vehicle runs on a road surface having a lower coefficient of friction ($\mu$); and the brake fluid pressure Pw for the front wheel is about to be reduced to go below that for the rear wheel which has been held. If the aforementioned check valve 113a were not provided, the brake fluid pressure Pw, since it is held, would build up to exceed that for the front wheel. Actually, however, according to this embodiment, under the action of the check valve 113a, the brake fluid pressure for the rear wheel is reduced to be equal to that for the front wheel, thereby more positively preventing the rear wheel from being locked.

As will be appreciated from the foregoing discussion, according to the foregoing embodiment of the present invention, it is possible to make the braking force applied to the front wheel work sufficiently while maintaining the braking force for the rear wheel. Especially for a split $\mu$ road surface, a sufficient braking force is imparted to the front wheel running on the high-$\mu$ portion of the road surface while the braking force for the rear wheel running on the low-$\mu$ portion thereof, thereby making it possible to remarkably shorten the braking distance. In addition, since the brake fluid pressure for the rear wheel running on the low-$\mu$ portion of the road surface is held in an optimum state through closure of the above-mentioned solenoid valve and thus prevented from building up, it is also possible to present the rear wheel from being locked.

Furthermore, according to the above-mentioned embodiment of this invention, under the action of the check valve provided in parallel with the above-described solenoid valve, in case the motor vehicle runs on a road surface of a still lower coefficient of friction and thus the brake fluid pressure for the front wheel is further reduced, then the brake fluid pressure for the rear wheel is also reduced to be equal thereto, thereby making it possible to more positively prevent the rear wheel from being locked.

While the invention has been illustrated and described in connection with specific embodiments thereof, it is be understood that the invention is by no means limited thereto but encompasses all changes and modifications which will become possible within the scope of the appended claims.

I claim:

1. An anti-skid control system for a motor vehicle having front righthand, rear lefthand, front lefthand and rear righthand wheels and equipped with an X-type two-channel piping brake apparatus wherein one of the two channels is associated with the front righthand and rear lefthand wheels while the other channel is associated with the front lefthand and rear righthand wheels, means for controlling said two channels independently of each other, said anti-skid control system comprising;

first valve means provided in a piping connecting a rear wheel cylinder to a modulator for increasing and reducing brake fluid pressure in a respective one of said two channels, said valve means being arranged to be closed only when the rear wheel tends to be locked earlier than the front wheel; and check valve means provided in parallel with said first valve means, said check valve means being arranged to only permit the brake pressure fluid to flow from said rear wheel cylinder to said modulator, said first valve means comprising a normally open solenoid valve adapted to be opened and closed in response to a signal derived from a control circuit for controlling said modulator, said control circuit including a select-low circuit for selecting the lower one of the front and rear wheel speeds in said respective one of the two channels and being arranged to control said modulator on the basis of the wheel speed selected by said select-low circuit, said control circuit further including a subtracter for subtracting the rear wheel speed from the front wheel speed in said respective one of the two channels so as to provide an output representing the difference between the two wheel speeds; a comparator for comparing the output of said subtracter with an amount corresponding to a predetermined speed difference $\Delta V$ and providing an output pulse when the output of said subtracter exceeds said amount corresponding to said predetermined speed difference $\Delta V$; and a flip-flop circuit arranged to be reset by the output pulse of said comparator and reset by a brake fluid pressure reducing signal supplied from said control circuit to said modulator; said first valve means being controlled in opening and closing by the output of said flip-flop circuit.

* * * * *